(12) United States Patent
Higashiyama

(10) Patent No.: US 7,083,317 B2
(45) Date of Patent: Aug. 1, 2006

(54) SURFACE-SHAPED LIGHT IRRADIATION DEVICE

(75) Inventor: Hiroshi Higashiyama, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 8 days.

(21) Appl. No.: 10/748,814

(22) Filed: Dec. 29, 2003

(65) Prior Publication Data

US 2004/0141305 A1    Jul. 22, 2004

(30) Foreign Application Priority Data

Dec. 27, 2002  (JP) ............................. 2002-379745

(51) Int. Cl.
*F21V 7/04* (2006.01)
(52) U.S. Cl. .................. 362/612; 362/621; 362/634
(58) Field of Classification Search ................ 362/26, 362/27, 30, 31, 320, 331, 559–561, 608–610, 362/612, 621, 628, 634, 800, 812; 349/62–65, 349/70; 385/129, 130, 901
See application file for complete search history.

(56) References Cited

U.S. PATENT DOCUMENTS

| | | | | |
|---|---|---|---|---|
| 3,892,959 A | * | 7/1975 | Pulles | 362/31 |
| 4,096,550 A | * | 6/1978 | Boller et al. | 362/627 |
| 4,714,983 A | * | 12/1987 | Lang | 362/27 |
| 4,729,185 A | * | 3/1988 | Baba | 40/546 |
| 5,136,483 A | * | 8/1992 | Schoniger et al. | 362/545 |
| 5,249,104 A | * | 9/1993 | Mizobe | 362/31 |
| 5,477,422 A | * | 12/1995 | Hooker et al. | 362/29 |
| 5,883,684 A | * | 3/1999 | Millikan et al. | 349/65 |
| 6,315,440 B1 | * | 11/2001 | Satoh | 362/561 |
| 6,530,670 B1 | * | 3/2003 | Hirayama | 362/31 |
| 6,672,734 B1 | * | 1/2004 | Lammers | 362/31 |
| 6,709,123 B1 | * | 3/2004 | Flohr et al. | 362/31 |
| 6,755,547 B1 | * | 6/2004 | Parker | 362/618 |
| 6,825,894 B1 | * | 11/2004 | Aoyagi et al. | 349/61 |
| 2001/0003504 A1 | * | 6/2001 | Ishihara et al. | 362/31 |
| 2001/0019380 A1 | * | 9/2001 | Ishihara | 349/65 |

FOREIGN PATENT DOCUMENTS

| | | | |
|---|---|---|---|
| CN | 1197934 A | | 11/1998 |
| CN | 1301977 A | | 7/2001 |
| JP | 08166588 A | * | 6/1996 |
| JP | 08-313902 A | | 11/1996 |
| JP | 2001143517 A | * | 5/2001 |

* cited by examiner

OTHER PUBLICATIONS

Office Action dated Dec. 5, 2004 issued by the Patent Office of the People's Republic of China.

*Primary Examiner*—Ali Alavi
*Assistant Examiner*—Hargobind S. Sawhney
(74) *Attorney, Agent, or Firm*—Frishauf, Holtz, Goodman & Chick, P.C.

(57) ABSTRACT

An LED is mounted on a flexible wiring board, and this flexible wiring board is adhered by a both-surface adhesive tape to a back of a light guiding plate to which a light reflecting film is adhered by an adhesive layer. The LED is kept at a desired set position by retaining the LED by a retaining section formed integrally with the light guiding plate in a state where a light emitting surface of the LED air tightly contacts a light entrance end surface of the light guiding plate, and by adhering a rear surface of the LED to an inner surface of the retaining section by an adhesive agent.

6 Claims, 5 Drawing Sheets

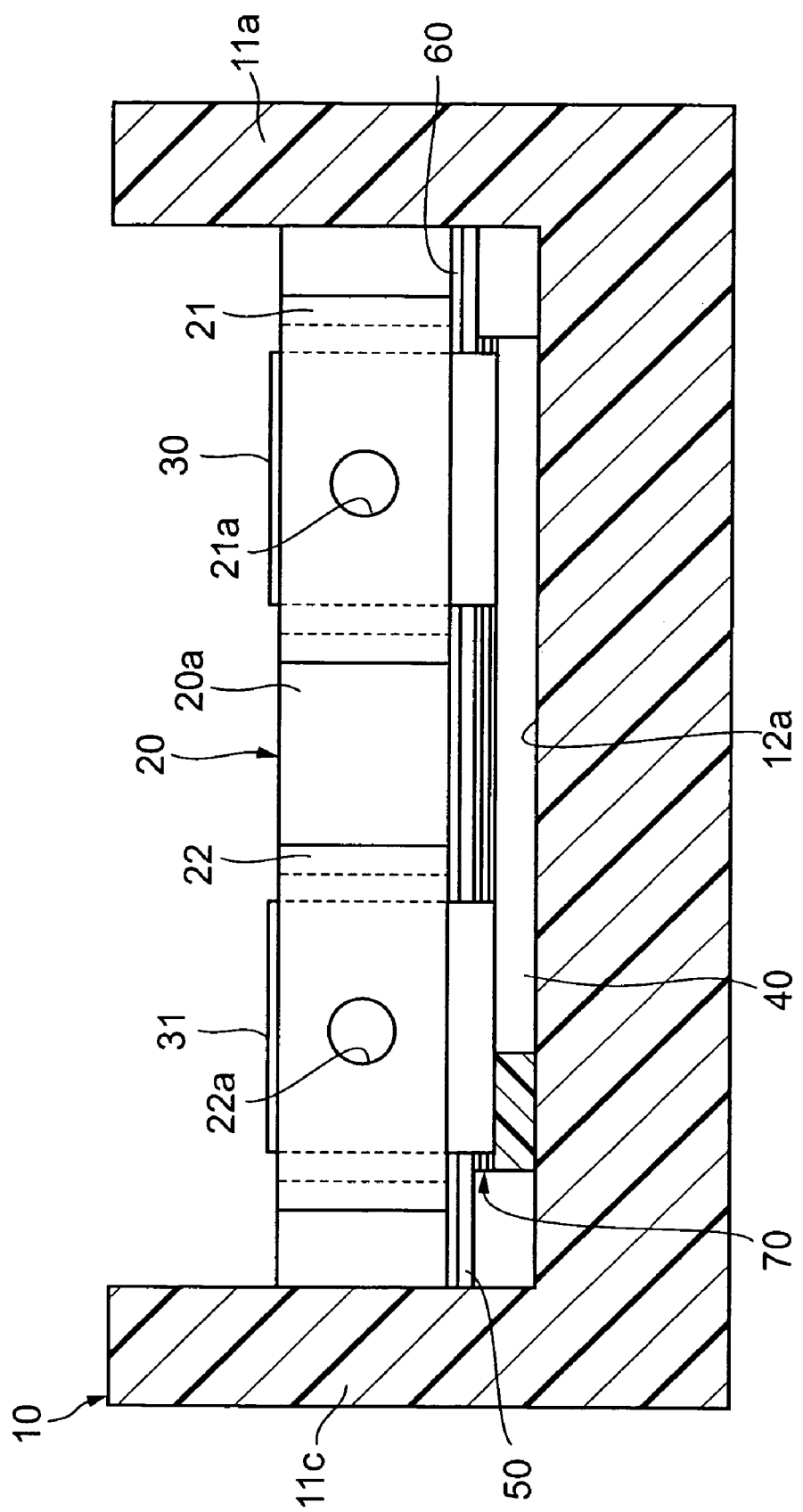

SURFACE-SHAPED LIGHT IRRADIATION DEVICE

BACKGROUND OF THE INVENTION

1. Field of the Invention

The present invention relates to a surface-shaped light irradiation device of a side light type which uses a dot light source.

2. Description of the Related Art

Conventionally, for the purpose of backlighting a liquid crystal display element, a light source is arranged in front of one end surface of a rectangular light guiding plate, and light emitted from this light source is introduced into this light guiding plate so as to be emitted from one plate surface of this light guiding plate. A surface-shaped light irradiation device of a side light type is widely used, which illuminates the liquid crystal display element with this light guiding plate oppositely arranged at the back of the liquid crystal display element. As a light source of this type of illumination device (light irradiation device), a dot light source such as a light emitting diode (hereinafter referred to as LED) or the like is employed in order to promote compactness and slimness of the liquid crystal display module including the backlight.

Such a surface-shaped light irradiation device of a side light type using a light emitting diode as a dot light source is disclosed in, for example, Unexamined Japanese Patent Application KOKAI Publication No. H8-313902.

It is required of the surface-shaped light irradiation device using the dot light source that the dot light source be accurately set at a predetermined position with respect to the light guiding plate without fail. The reason for this is as follows. Since the dot light source is a light source which emits light radiately, it has more difficulty in obtaining a surface-shaped irradiation light having an intensity which is uniform over an entire light emitting area defined on a light emitting surface of the light guiding plate, than a linear light source such as a cathode tube or the like which emits light linearly, and thus various optical structures for obtaining an irradiation light having a uniform intensity distribution are employed therefor. As examples of such optical structures, a concentric ditch having its center correspond to the position at which the dot light source is set is formed in the back surface (counter light emitting surface) of the light guiding plate, or a prism sheet in which likewise a concentric ditch is formed is arranged at the side of the front surface (light emitting surface) of the light guiding plate.

Since there are differences in thermal expansion coefficient and shrinkage ratio among the components constituting the surface-shaped light irradiation device using the dot light source, repetition of heating and cooling of this light irradiation device due to changes in atmospheric temperature and turning on/off of the device itself causes the dot light source to slide from the right set position or changes the setting state of the dot light source, resulting in unevenness in the intensity distribution of the surface-shaped irradiation light and degradation of the intensity.

SUMMARY OF THE INVENTION

It is an object of the present invention to provide a surface-shaped light irradiation device using a dot light source and capable of obtaining an irradiation light having a uniform intensity distribution and sufficient average intensity stably for a long time.

To achieve the above object, a surface-shaped light irradiation device according to a first aspect of the present invention comprises: a dot light source which emits a light substantially radiately; and a light guiding plate which comprises a light entrance end surface from which a light emitted from the dot light source enters, a light emitting surface which is one principal surface for guiding the light entering from the light entrance end surface and emits a substantially uniform light therefrom, and a back surface which is the other principal surface oppose to the light emitting surface, and further includes a retaining section which retains the dot light source at a predetermined set position.

According to the surface-shaped light irradiation device of the present invention structured as described above, since the retaining section for retaining the dot light source at a predetermined set position is formed at a part of the light guiding plate, even if the light guiding plate repeats expansion and contraction due to changes in the atmospheric temperature and repetition of heating and cooling in accordance with turning on/off of the dot light source, the relative position of the dot light source with respect to the light guiding plate does not change. Accordingly, it is possible to enable the surface-shaped light irradiation device using the dot light source to obtain an irradiation light having a uniform intensity distribution and sufficient average intensity stably for a long time.

In the surface-shaped light irradiation device of the present invention, it is preferred that the retaining section be formed on the light entrance end surface positioned at one end of the light guiding plate, and be constituted by a caved portion into which the dot light source fits or by a wall which is formed so as to surround the dot light source, and the caved portion or the wall be formed integrally with the light guiding plate by being formed extendedly from the light entrance end surface.

In the surface-shaped light irradiation device of the present invention, it is preferred that the dot light source comprise a flat light emitting surface for emitting a light toward a part of an external surface, and be retained by the retaining section in a state where the light emitting surface abuts on the light entrance end surface of the light guiding plate. Due to this, it is possible to retain the set position of the dot light source more stably, and to more improve the intensity of the irradiation light by efficiently utilizing the emitted light without any loss. Further, it is preferred that the dot light source be fixed inside the retaining section by an adhesive agent stuffed between its surface other than the light emitting surface and the retaining section, the retaining section comprise a wall which is formed in such a manner as to protrude from the light entrance end surface positioned at one end of the light guiding plate and to surround the dot light source, and a hole for storing an adhesive agent be formed in the wall.

Furthermore, it is preferred that the dot light source be mounted on a flexible wiring board on which a circuit for lighting the dot light source is formed, and a part of the flexible wiring board be adhered to a back of the light guiding plate oppose to the light emitting surface of the light guiding plate by an adhesive member. Due to this, the surface-shaped light irradiation device can further be compacted and slimmed. It is further preferred that a both-surface adhesive tape be used as the adhesive member. Due to this, it is possible to manufacture the surface-shaped light irradiation device of the resent invention easily with a less number of manufacturing steps.

BRIEF DESCRIPTION OF THE DRAWINGS

These objects and other objects and advantages of the present invention will become more apparent upon reading of the following detailed description and the accompanying drawings in which:

FIG. 3A shows the initial state after manufacturing and FIG. 3B shows a state in the process of usage;

FIG. 4 is a cross section of the backlight device shown in FIG. 1 as sectioned along a line IV—IV; FIG. 5A shows the initial state after manufacturing and FIG. 5B shows a state in the process of usage.

DETAILED DESCRIPTION OF THE PREFERRED EMBODIMENT

An embodiment of the present invention will now be specifically explained with reference to the drawings.

A backlight device for a liquid crystal display element as one embodiment of the present invention will be explained based on FIG. 1 to FIG. 4.

Figure 1:
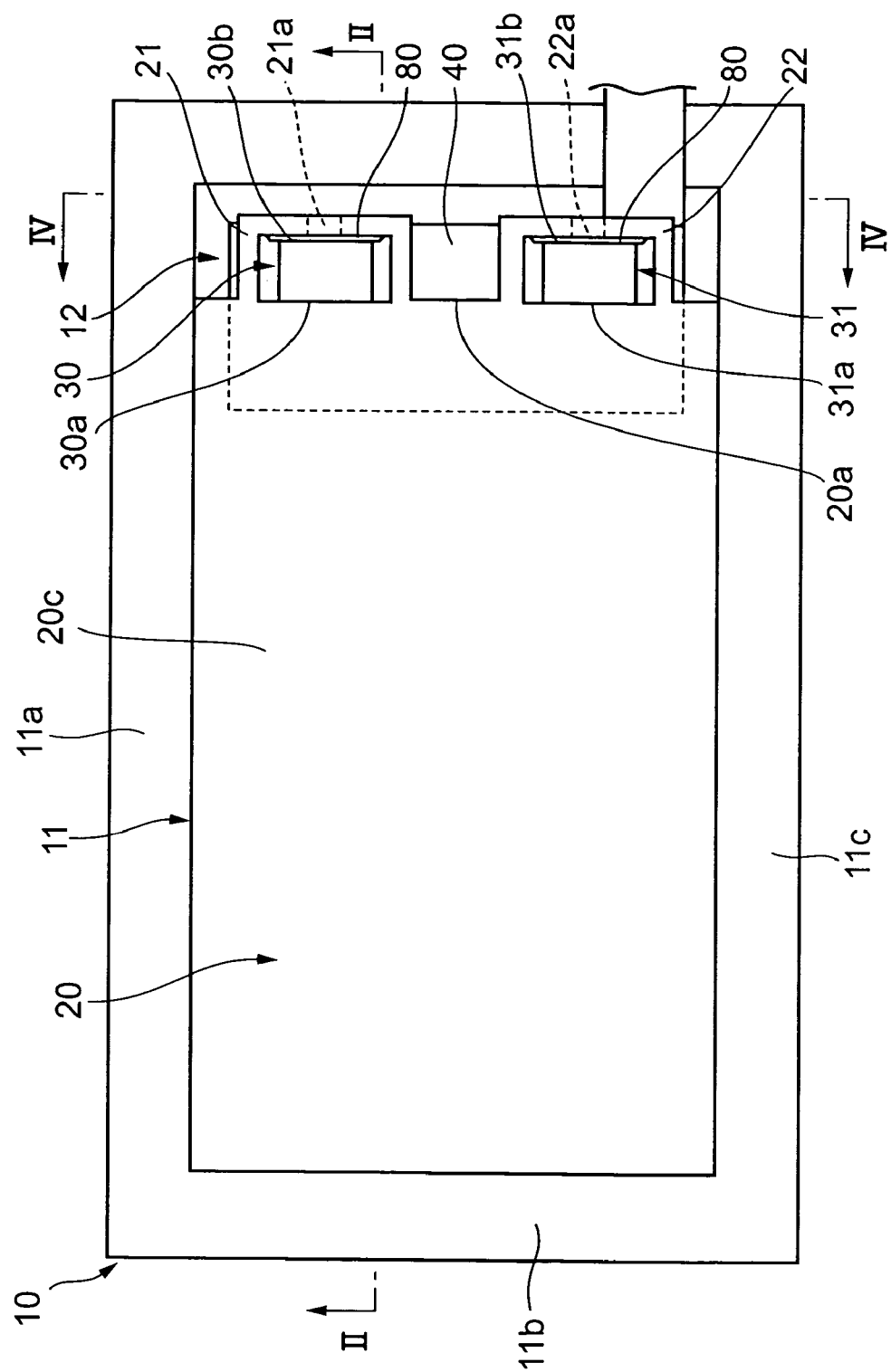
FIG. 1 is a top view showing a backlight device for liquid crystal display element as one embodiment of the present invention.

FIG. 1 is a top view showing a state where a backlight device according to the present embodiment is contained in a containing case 10. The containing case 10, whose appearance viewed from the top (hereinafter referred to as top view appearance) forms a rectangle, comprises a light guiding plate containing region 11 whose three sides are surrounded by side walls 11a to 11c, and a light source unit containing region 12 in which a light source and its accompanying circuit substrate, etc. i.e. the light source function of the present backlight device are/is contained.

A light guiding plate 20 made of a transparent material such as acryl resin or the like is contained in the light guiding plate containing region 11. The light guiding plate 20 is contained in the light guiding plate containing region 11 such that its flat end surfaces on three sides are along the internal surfaces of the flat side walls 11a to 11c of the light guiding plate containing region 11. The end surface on the remaining one side of the light guiding plate 20 forms a light entrance portion from which light is introduced. The light guiding plate 20 comprises a light entrance end surface 20a from which light emitted from LEDs (light emitting diodes) 30 and 31 as dot light sources enters, a light emitting surface 20c which, as one principal surface, guides the light entering from the light entrance end surface 20a thereto and emits a substantially uniform light therefrom, and a back surface 20b which is the other principal surface oppose to the light emitting surface 20c.

The light entrance end surface 20a, which is on the side on which the light entrance portion of the light guiding plate 20 is formed, has retaining sections 21 and 22 for retaining therein the LEDs 30 and 31 as the dot light sources formed symmetrically with respect to the center of the end surface 20a. The retaining sections 21 and 22 of the present embodiment is formed into a frame structure constituting a U shape as a top view, and is integrally formed with the body of the light guiding plate 20 when the light guiding plate 20 is formed of resin. That is, the retaining sections 21 and 22 are constituted by caved portions which the dot light sources made of the LEDs 30 and 31 fit into or by walls formed so as to surround the dot light sources, and are formed integrally with the light guiding plate 20 with the light entrance end surface 20a of the light guiding plate 20 extended accordingly. The number of manufacturing steps required does not increase by forming the retaining sections 21 and 22 in this manner.

Figure 2:
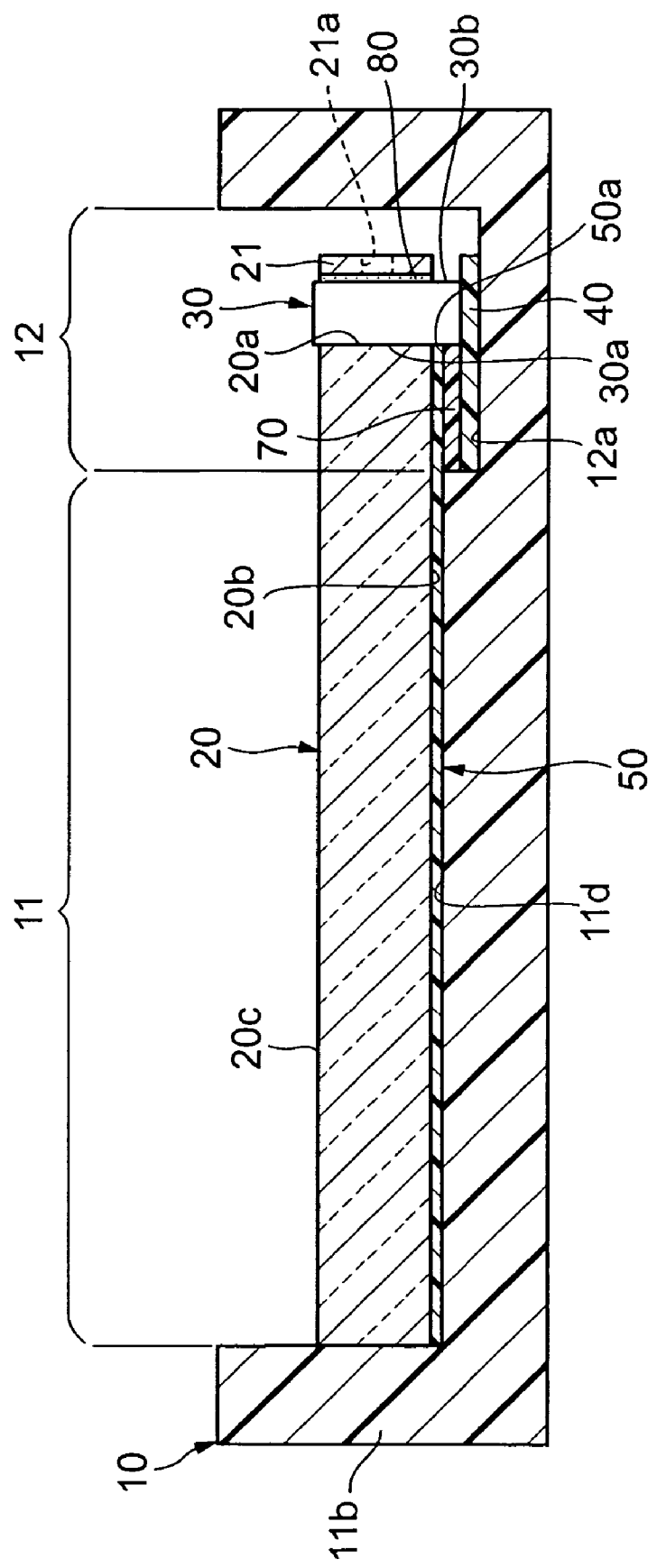
FIG. 2 is a cross section of the backlight device shown in FIG. 1 as sectioned along a line II—II.

As shown in FIG. 2, each of the LEDs 30 and 31 is directly mounted on a flexible wiring board 40 at a predetermined position by a COF (Chip On Film) method. That is, compacting and slimming of the light irradiation device is further promoted by directly mounting the LEDs 30 and 31 on the flexible wiring board 40 which is thin no more than approximately 100 μm. The flexible wiring board 40 on which the LEDs 30 and 31 are mounted is fixed on the back surface 20b of the light guiding plate 20 via an adhesive member.

Figure 3A:
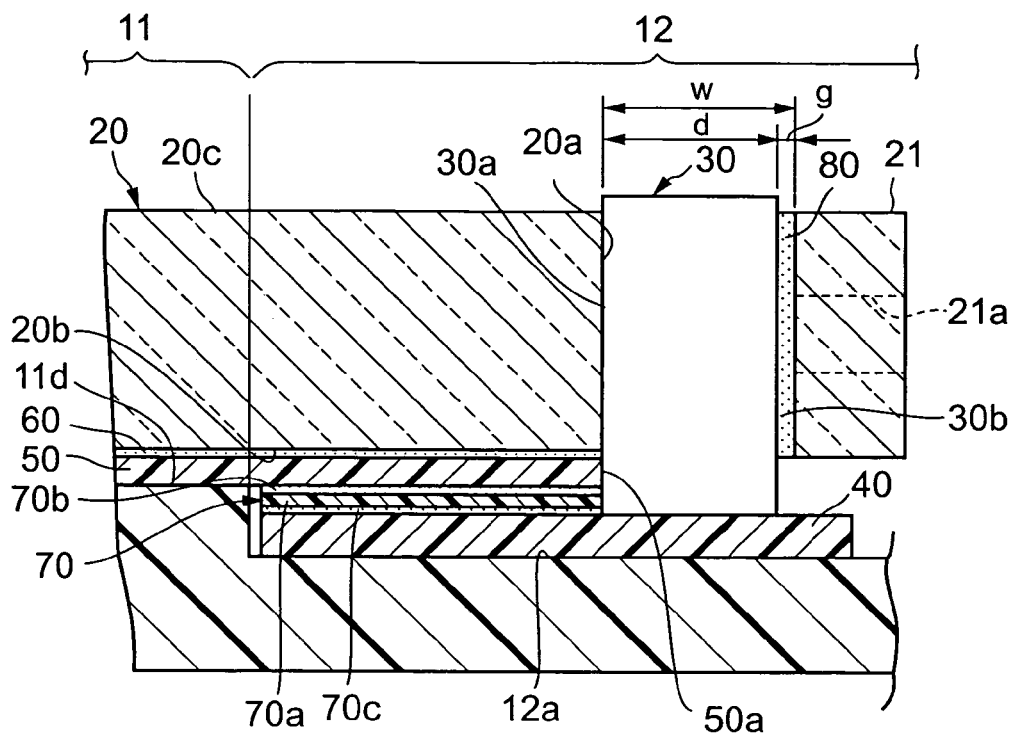
FIGS. 3A and 3B are partially enlarged cross sections showing the principal components in the cross section shown in FIG. 2 in enlargement, where

With reference to FIG. 3A showing principal components in FIG. 2 in enlargement, the back surface 20b of the light guiding plate 20 of the present embodiment has a light reflecting film 50 adhered thereto by an adhesive layer 60 over approximately the entire area thereof except the frame-like retaining sections 21 and 22. In this case, the light reflecting film 50 is adhered with its end surface 50a brought into straight arrangement with respect to the light entrance end surface 20a of the light guiding plate 20 to be on a common plane. The aforementioned flexible wiring board 40 on which the LEDs 30 and 31 are mounted is adhered on the back of the light reflecting film 50 by a both-surface adhesive tape 70. In this case, the flexible wiring board 40 is adhered on the back of the light reflecting film 50 such that flat light emitting surfaces 30a and 31a of the LEDs 30 and 31 airtightly contact the flat light entrance end surface 20a of the light guiding plate 20 and the end surface 50a of the light reflecting film 50 which is in straight arrangement with the light entrance end surface 20a.

As shown in FIG. 3A, the both-surface adhesive tape 70 of the present embodiment is formed by stacking adhesive layers 70b and 70c having a thickness of approximately 5 to 10 μm on both of the front and back of a base film 70a having a thickness of approximately 40 μm, and is provided between the flexible wiring board 40 and the back of the light reflecting film 50 over an area from the end surface of the flexible wiring board 40 at the side the LEDs 30 and 31 are not mounted till the LEDs 30 and 31.

The LEDs 30 and 31, which are set at predetermined positions by the both-surface adhesive tape 70 and the flexible wiring board 40, are kept in the appropriate state at the predetermined set positions by the frame-like retaining sections 21 and 22 which are formed integrally with the light guiding plate 20. That is, the LEDs 30 and 31 are surrounded by the retaining sections 21 and 22 on three sides other than their light emitting surfaces 30a and 31a, have their respective flat light emitting surfaces 30a and 31a abut airtightly on the flat end surface 20a of the light guiding plate 20, and have their rear surfaces 30b and 31b behind the light emitting surfaces 30a and 31a adhered on the opposing inner surfaces of the frame-like retaining sections 21 and 22. In this case, the depth d of the LEDs 30 and 31 and the inner width w of the retaining sections 21 and 22 are so determined as to bear slight clearances g between the rear surfaces 30b and 31b and the inner surfaces of the frame-like retaining sections 21 and 22. An adhesive agent 80 is poured into these clearances g. As shown in FIG. 4 which shows a cross section of FIG. 1 as sectioned along a line IV—IV, holes 21a and 22a for adhesive agent storage are bored in the centers of the portions of the retaining sections 21 and 22 that are opposed to the rear surfaces 30b and 31b of the LEDs 30 and 31. These adhesive agent storage holes 21a and 22a serve as holes from which the adhesive agent is poured and also serve as buffers which swallow and store an excess amount of the adhesive agent when it is poured or an amount of the agent that is thermally expand when the temperature rises.

As shown in FIG. 2, the light source unit of the backlight device for liquid crystal display element according to the present embodiment whose LEDs 30 and 31 are retained at the aforementioned predetermined set positions, is contained in the light source unit containing region 12 of the containing case 10, and the light source unit containing region 12 is formed deeper than the light guiding plate containing region 11 by a dimension obtained by adding the thickness of the flexible wiring board 40 and the thickness of the both-surface adhesive tape 70. Accordingly, at the initial stage when the present backlight device is contained in the containing case 10, the back of the light guiding plate 20 (the back of the light reflecting film 50) is placed along a bottom surface 11d of the light guiding plate containing region 11, and the flexible wiring board 40 is placed along a bottom surface 12a of the light source unit containing region 12. Consequently, at this initial stage, the LEDs 30 and 31 can be retained at the appropriate set positions at which the respective light emitting surfaces 30a and 31a airtightly contact the light entrance end surface 20a of the light guiding plate 20, without the need of providing the retaining sections 21 and 22 to the light guiding plate 20. However, if heating and cooling are repeated in accordance with changes in the atmospheric temperature or turning on/off of the backlight device itself, the set positions and setting state of the LEDs 30 and 31 begin to change due to differences in thermal expansion coefficient and shrinkage ratio among the structural components such as the light guiding plate 20, the flexible wiring board 40, the both-surface adhesive tape 70, etc. This state will be explained based on FIG. 5A and FIG. 5B.

Figure 5A:
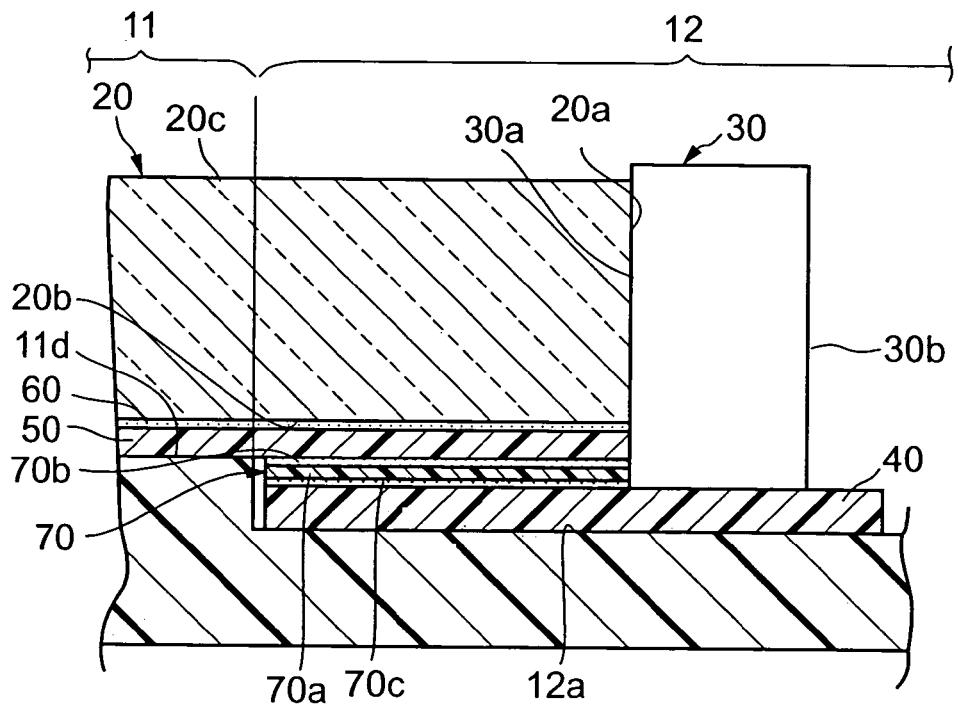
FIGS. 5A and 5B are partially enlarge cross sections of a backlight device as a comparative example with respect to the embodiment of the present invention, where

FIG. 5A is a cross section showing an example where the frame-like retaining sections 21 and 22 are not provided to the light guiding plate 20 of the present embodiment, as a comparative example, and shows the initial stage when the present backlight device is contained in the containing case 10. At this initial stage, the back of the light guiding plate 20 (the back of the light reflecting film 50) is placed along the bottom surface 11d of the light guiding plate containing region 11 and the flexible wiring board 40 is placed along the bottom surface 12a of the light source unit containing region 12, and the LED 30 is kept in a state where its light emitting surface 30a airtightly contacts the light entrance end surface 20a of the light guiding plate 20.

Figure 5B:
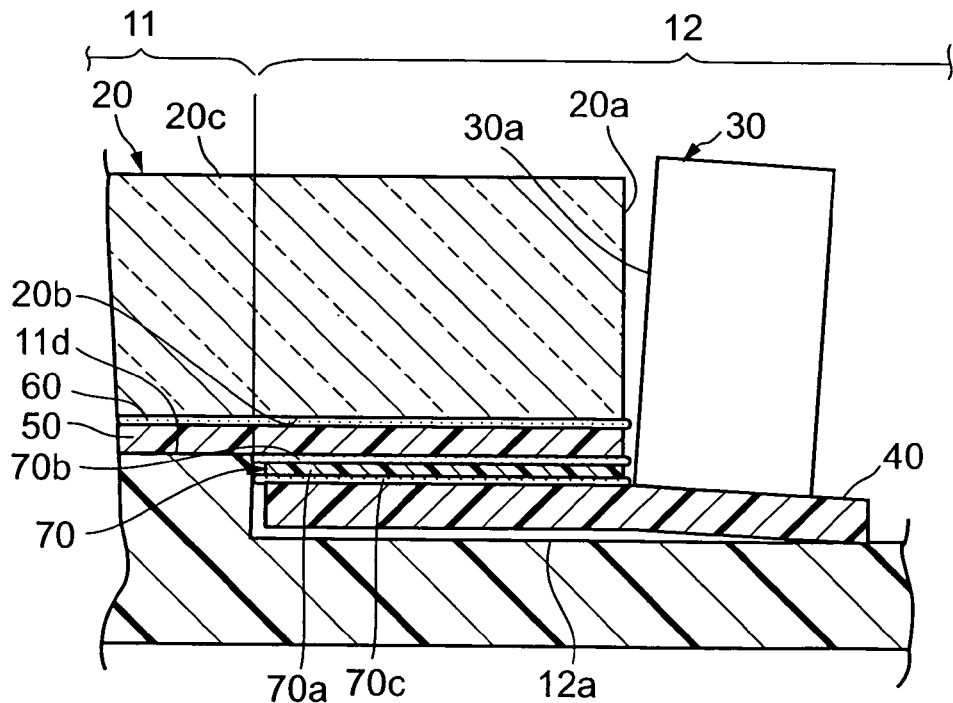

FIG. 5B shows a state where the present backlight device is repeatedly subjected to heating and cooling due to changes in the atmospheric temperature or turning on/off of the device itself. Since according to the present embodiment, the flexible wiring board 40 is adhered by the both-surface adhesive tape 70 to the light reflecting film 50 which is adhered onto the back surface 20b of the light guiding plate 20, total of three reversible adhesive resin layers, namely the two adhesive layers 70b and 70c of the both-surface adhesive tape 70 and the adhesive layer 60, intervene between the structural components. If these reversible adhesive resin layers are heated and softened and thereby thinned by flowing out from between the components, and then in this state cooled and hardened, a gap is produced between the flexible wiring board 40 and the bottom surface 12a of the light source unit containing region 12. This causes the area of the flexible wiring board 40 where the LED 30 is mounted to be dropped down due to the weight of the LED 30, etc. and causes the mounted LED 30 to be apart from the light entrance end surface 20a and slanted, as shown in FIG. 5B. As a result, the ratio of the light to be emitted toward a desired direction from a light emitting area and used as a surface-shaped irradiation light with respect to the light emitted from the LED 30 is lowered, which means that the loss of light is increased, and the intensity of the surface-shaped irradiation light is lowered.

Figure 3B:
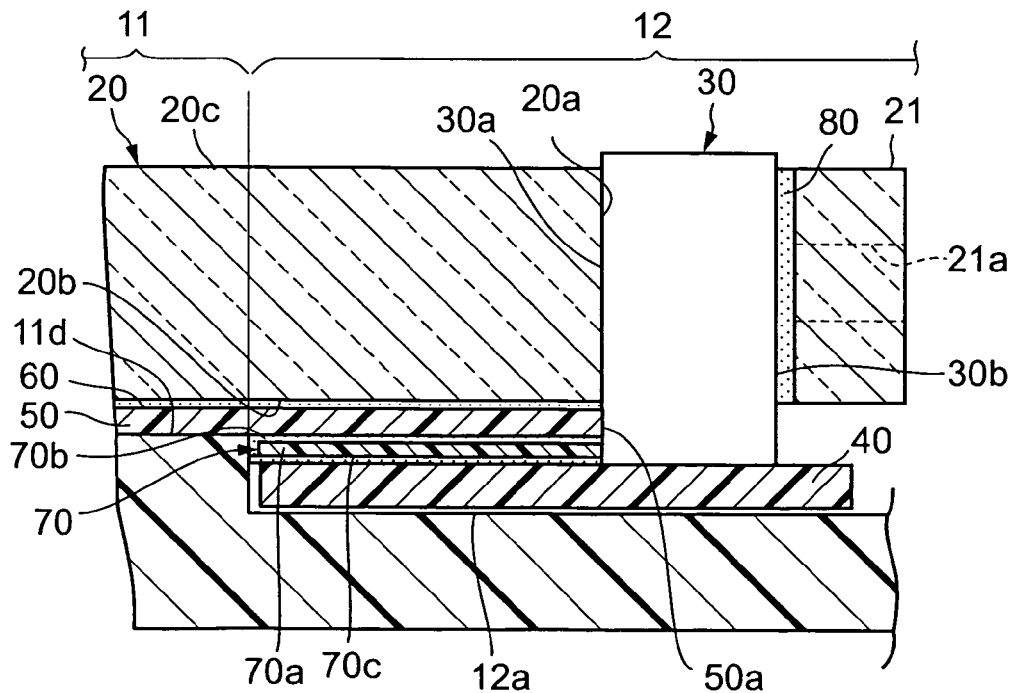

However, in the surface-shaped light irradiation device of the present invention, the frame-like retaining sections 21 and 22 are provided to the light guiding plate 20 as described above, in order to keep the light emitting surfaces 30a and 31a of the LEDs 30 and 31 in airtight contact with the light entrance end surface 20a of the light guiding plate 20. Therefore, even if the adhesive layers 70b and 70c of the both-surface adhesive tape 70 and the adhesive layer 60 experience the same softening and shrinking effects as explained with reference to FIG. 5B and the back of the flexible wiring board 40 goes up off the bottom surface 12a of the light source unit containing region 12, the LEDs 30 and 31 are kept at the desired right set positions where the light emitting surfaces 30a and 31a airtightly contact the light entrance end surface 20a of the light guiding plate 20, as shown in FIG. 3B.

Here, also the adhesive agent 80 for adhering the rear surfaces 30b and 31b of the LEDs 30 and 31 to the inner surfaces of the frame-like retaining sections 21 and 22 is heated and softened as well as the adhesive layer 60, etc. However, since the retaining sections 21 and 22 are integrally formed with the body of the light guiding plate 20, if the light guiding plate 20 is heated and thermally expanded, the clearances g expand accordingly, and if the light guiding plate 20 is cooled and contracted, the clearances g contract accordingly. Therefore, the adhesive agent 80 does not fall off the rear surfaces 30b and 31b of the LEDs 30 and 31 and the inner surfaces of the retaining sections 21 and 22.

Since in the surface-shaped light irradiation device of the present invention, the frame-like retaining sections 21 and 22 are integrally formed with the body of the light guiding plate 20 as described above, even if heating and cooling are repeated for a long time in accordance with changes in the atmospheric temperature and turning on/off of the light irradiation device itself, the LEDs 30 and 31 can be kept securely for a long time at the desired set positions and setting state described above, i.e. the right setting state where the light emitting surfaces 30a and 31a airtightly contact the light entrance end surface 20a of the light guiding plate 20. As a result, it is possible to provide a surface-shaped light irradiation device using dot light sources, which can obtain a desired irradiation light having a sufficiently high average intensity and uniform intensity distribution, stably for a long time.

The present invention is not limited to the above-described embodiment.

For example, the set position where a dot light source such as an LED or the like should be retained is not limited to the position where its light emitting surface 30a abuts on the light entrance end surface 20a of the light guiding plate 20, but may be a position apart from the light entrance end surface 20a with a predetermined interval between them.

Further, the dot light source may be mounted on a nonflexible ordinary printed circuit board (PCB), and this printed circuit board may be fixed onto the back of the light guiding plate 20. In this case, the defect of the printed circuit board being dropped downward to make the dot light source slanted hardly occurs, whereas the electrical connection parts of the dot light source and printed circuit board might be separated from each other due to difference in thermal expansion coefficient between the printed circuit board and the light guiding plate 20. However, the adhesive agent 80, which adheres the rear surface of the dot light source to the retaining sections 21 and 22 of the light guiding plate 20, absorbs the difference in thermal expansion coefficient to avoid separation between the electrical connection parts of the dot light source and printed circuit board.

Furthermore, the means for adhering the flexible wiring board 40 on which the dot light source is mounted to the back of the light guiding plate 20 is not limited to the both-surface adhesive tape 70, but the flexible wiring board 40 may be adhered to the back of the light guiding plate 20 by only an adhesive layer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-379745 filed on Dec. 27, 2002 and including specification, claims, drawings and summary. The disclosure of the above Japanese Patent Application is incorporated herein by reference in its entirety.

What is claimed is:

1. A surface-shaped light irradiation device comprising:
   a dot light source which comprises a flat light emitting surface for emitting a light, and which emits a light substantially radiately; and
   a light guiding plate which comprises a light entrance end surface from which a light emitted from said flat light emitting surface of said dot light source enters, a light emitting surface which is one principal surface for guiding the light entering from said light entrance end surface and emits a substantially uniform light therefrom, a back surface which is an other principal surface opposite to said light emitting surface, and a retaining section which retains said dot light source at a predetermined set position, wherein said retaining section includes a wall which surrounds a periphery of said dot light source, said wall being formed by said light entrance end surface positioned at one end of said light guiding plate, and said dot light source is disposed in an area surrounded by said retaining section and said light entrance end surface, and is fixed to said retaining section in a state where said flat light emitting surface abuts on said light entrance end surface of said light guiding plate by an adhesive agent disposed between a surface of the dot light source, other than its flat light emitting surface, and the retaining section.

2. The surface-shaped light irradiation device according to claim 1,
   wherein said retaining section is formed integrally with said light guiding plate by being formed extendedly from said light entrance end surface positioned at one end of said light guiding plate.

3. The surface-shaped light irradiation device according to claim 1,
   wherein said dot light source is fixed to said wall opposite to said light entrance end surface by an adhesive agent.

4. The surface-shaped light irradiation device according to claim 3,
   wherein said retaining section comprises a wall which is formed in such a manner as to protrude from said light entrance end surface positioned at one end of said light guiding plate and to surround said dot light source, and a hole for storing an adhesive agent is formed in said wall.

5. The surface-shaped light irradiation device according to claim 1,
   wherein:
   said dot light source is mounted on a flexible wiring board on which a circuit for lighting said dot light source is formed; and
   a part of said flexible wiring board is adhered to a back of said light guiding plate by an adhesive member.

6. The surface-shaped light irradiation device according to claim 5,
   wherein said adhesive member is a both-surface adhesive tape.

* * * * *